United States Patent [19]
Palko

[11] Patent Number: 5,378,105
[45] Date of Patent: Jan. 3, 1995

[54] CARGO HANDLING SYSTEM

[76] Inventor: Richard L. Palko, Rte. 4, Box 168, Fayetteville, Tenn. 37334

[21] Appl. No.: 970,067

[22] Filed: Nov. 2, 1992

[51] Int. Cl.6 .......................................... B65G 67/02
[52] U.S. Cl. .................................. 414/540; 410/67; 414/347; 414/343; 414/545; 414/495
[58] Field of Search ............... 414/495, 541, 545, 343, 414/347, 345, 540, 104; 410/67, 66, 94, 95, 79

[56] References Cited

U.S. PATENT DOCUMENTS

| | | | |
|---|---|---|---|
| 1,693,607 | 12/1928 | Kellett | 410/67 |
| 2,519,721 | 8/1950 | Taylor | 410/67 |
| 2,631,885 | 3/1953 | Ault | 410/67 |
| 2,820,559 | 1/1958 | Armitage | 410/67 X |
| 2,858,774 | 11/1958 | Batten | 410/67 |
| 3,159,111 | 12/1964 | Gutridge et al. | 410/79 |
| 3,180,281 | 4/1965 | Sherrie et al. | 410/67 X |
| 3,446,462 | 5/1969 | Brenia | 410/94 X |
| 3,469,723 | 9/1969 | Mathley et al. | 410/67 X |
| 3,504,636 | 4/1970 | Adler | 410/67 |
| 3,666,127 | 5/1972 | Guyaux | 414/347 X |
| 3,973,684 | 8/1976 | Di Martino | 410/79 X |
| 4,203,697 | 5/1980 | Cayton | 410/67 X |
| 4,231,695 | 11/1980 | Weston, Sr. | 410/67 X |
| 5,076,745 | 12/1991 | Klein | 410/94 |
| 5,092,722 | 3/1992 | Reazer, III et al. | 410/104 |
| 5,135,350 | 8/1992 | Eelman et al. | 414/347 X |
| 5,137,403 | 8/1992 | McCaffrey | 410/104 X |

FOREIGN PATENT DOCUMENTS 1524518  9/1978  United Kingdom ............... 410/67

Primary Examiner—Michael S. Huppert
Assistant Examiner—James T. Eller, Jr.
Attorney, Agent, or Firm—C. A. Phillips

[57] ABSTRACT

A cargo handling and restraining system for loading, unloading, and transporting cargo containers in a carrier vehicle. The carrier is provided with a supporting floor (bed) having a plurality of tracks disposed thereon. The tracks include a channel disposed between a pair of spaced, horizontally extending members, and each container is provided with members which "ride" in the channel of the tracks to move the containers along the track. A hook assembly is provided at opposite ends and on the bottom of the containers for engaged relation with a retaining mechanism which positively locks adjacent containers together and to the track. A locking member is provided for rigidly securing the last loaded container (toward the rear of the bed) to the track. A cargo loader mechanism is provided to load and unload the cargo onto and off of the bed, and a cargo cart is provided to transport the cargo from or to a storage bin.

6 Claims, 5 Drawing Sheets

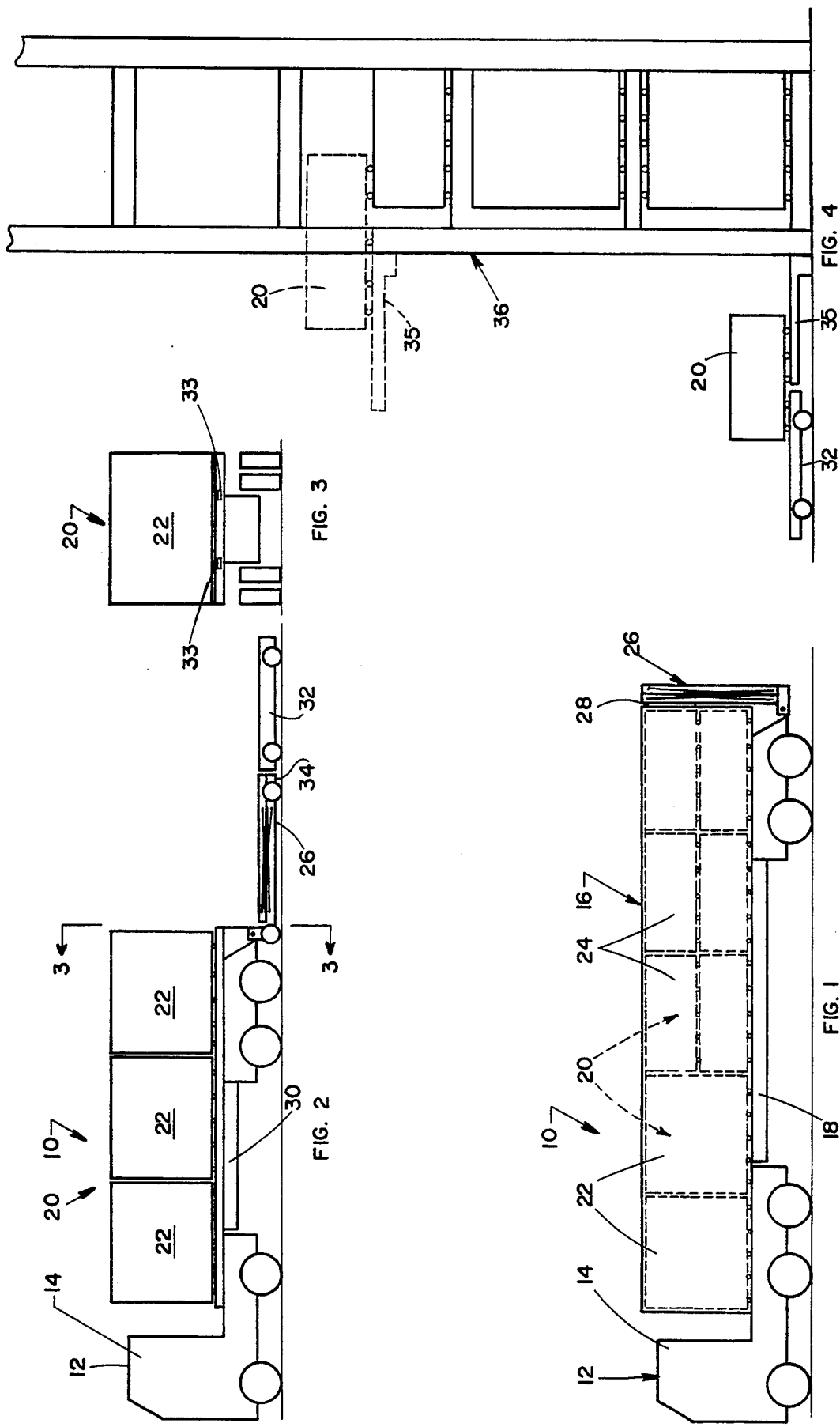

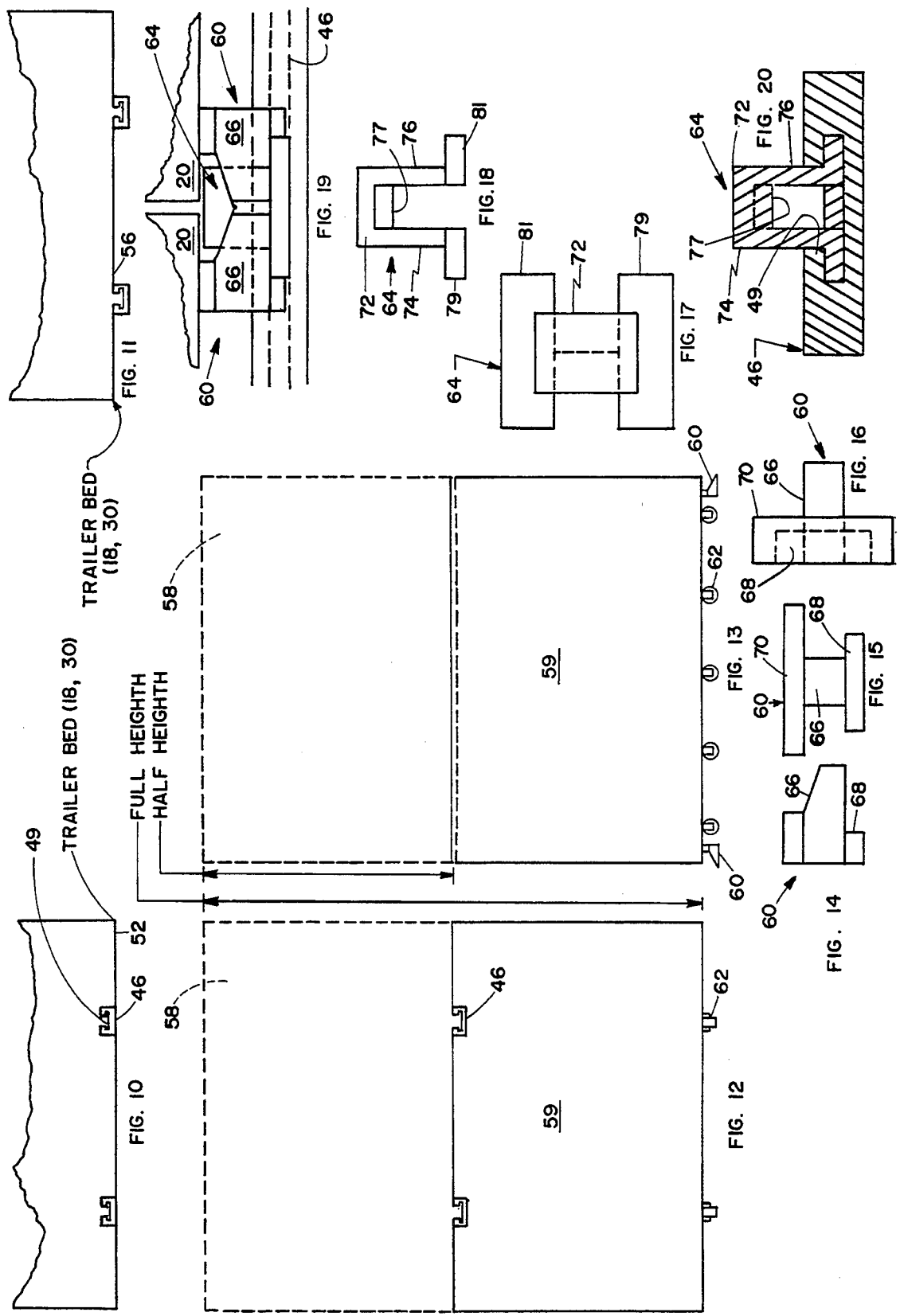

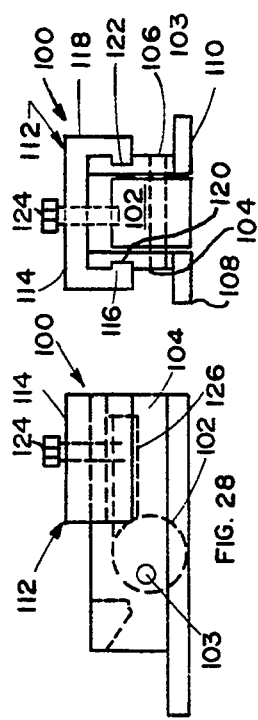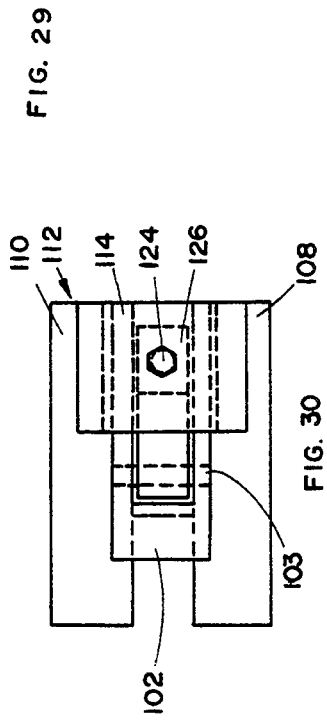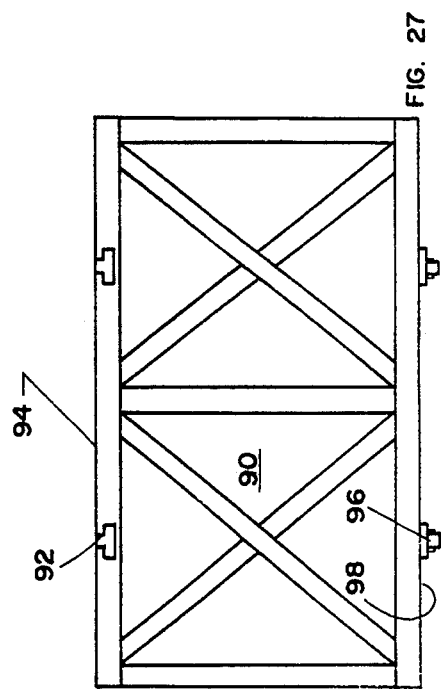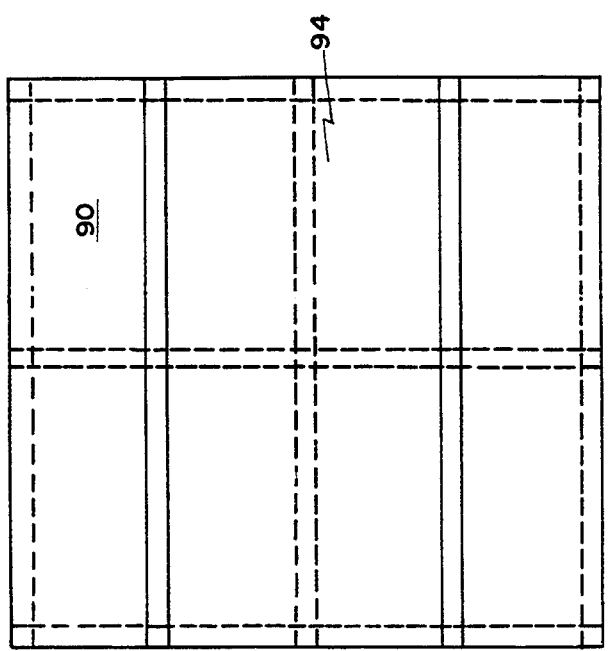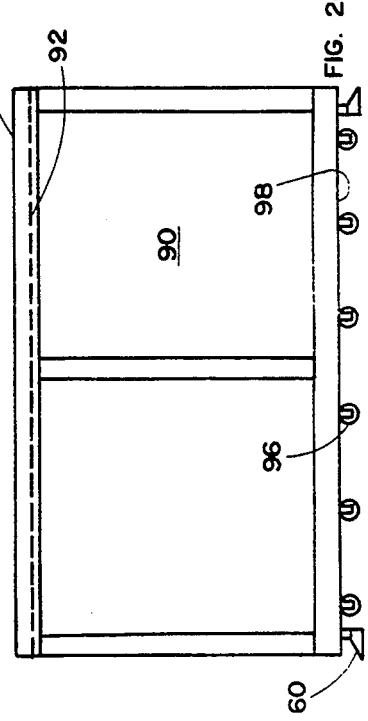

CARGO HANDLING SYSTEM

FIELD OF THE INVENTION

The present invention relates generally to the field of cargo handling and more specifically to a cargo-carrying, loading and unloading system having restraining means to prevent undesirable shifting of palletized or containerized cargo during transport thereof.

BACKGROUND OF THE INVENTION

There are many cargo handling systems in present-day use. Some such systems are disclosed by the following patents: U.S. Pat. No. 3,262,588 entitled "Cargo Handling Apparatus," issued Jul. 26, 1966, to R. W. Davidson; U.S. Pat. No. 3,180,281 entitled "Container Support and Locking Arrangement," issued Apr. 27, 1965, to R. M. Sherrie et al; U.S. Pat. No. 3,884,374 entitled "Truck Loading System," issued May 20, 1975, to Albert J. Swallow, Jr.; U.S. Pat. No. 3,446,462 entitled "Cargo Carrier Interlock System," issued May 27, 1969, to P.S. Brenna; U.S. Pat. No. 4,929,133 entitled "Loading Pallet For Aircraft Cargo Container," issued May 29, 1990, to Albert D. Wiseman; U.S. Pat. No. 2,519,721 entitled "Clamping and Shock Absorbing Device," issued Aug. 22, 1950, to M. P. Taylor; and U.S. Pat. No. 4,009,792 entitled "Cargo Conveying Apparatus on Motor Truck," issued Mar. 1, 1977, to Sano et al.

While the above-identified U.S. patents disclose various structures for cargo handling, none of the above-identified patents disclose the uncomplicated cargo loading and unloading apparatus as disclosed herein, including the use of tracks which permit movement of cargo containers therealong on the surface of a truck bed, the apparatus being provided with one locking means to secure adjacent containers together and to the track and another locking means to secure the last container placed on the truck bed to the track and thus secure the adjacent mutually secured containers against movement. The securing means may also be used to secure stacked half-containers together and to the tracks. Additionally, a loader mechanism is provided for loading and unloading the containers to the truck bed.

BRIEF DESCRIPTION OF THE DRAWINGS

FIG. 1 is a side elevational view of a truck having containers loaded internally therein. A container loader apparatus is shown attached to the vehicle.

FIG. 2 is a side elevational view of a truck having containers loaded externally thereon. A container loader apparatus and a container transfer cart is shown at the rear of the vehicle in operating position.

FIG. 3 is an end elevational view taken along line 3—3 of FIG. 2.

FIG. 4 is an elevational view illustrating the cargo loading conveyor positioned to receive a container from a rack in a warehouse or the like.

FIG. 10 is a partial end elevational view of a trailer bed having a track added to the existing bed of an existing trailer.

FIG. 11 is a partial end view of a trailer bed having tracks which have been installed therein during the manufacture of the trailer.

FIG. 12 is an elevational end view of stacked half height containers utilizing the inverted "T" track system of the present invention for the upper container and a roller system for the lower container.

FIG. 13 is an elevational side view of the containers of FIG. 12.

FIGS. 14, 15, and 16 are side, front, and top views, respectively, of the container end hooks for securely locking the containers against the rails to prevent movement of the containers during transportation.

FIGS. 17 and 18 are top and front views, respectively, of the track/container clamp which cooperate with the container end hook to lock the containers against movement.

FIG. 19 is an elevational side view of an assembled (secured) container hook and track/container clamp.

FIG. 20 is a sectional view of the track/container clamp of FIGS. 17 and 18 shown positioned in a track.

FIGS. 25, 26, and 27 are top, side, and end views, respectively, of an open-type container for pallet handling.

FIGS. 28, 29, and 30 are side, end, and top views of a mid-trailer and transfer cart container/track lock.

DESCRIPTION OF THE PREFERRED EMBODIMENT

Figure 7:
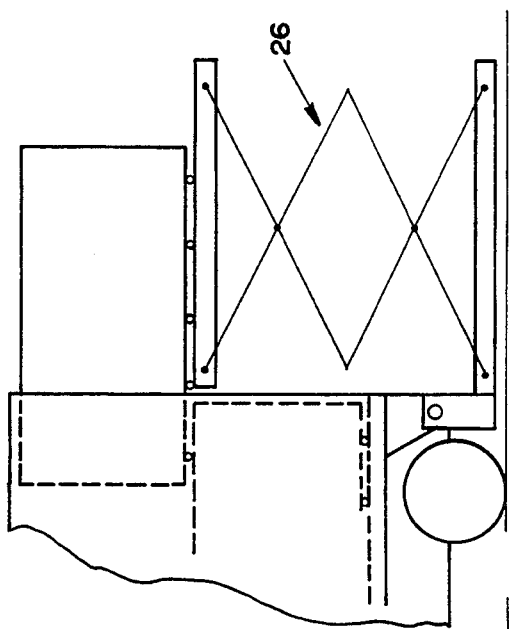
FIG. 7 is a partially elevational view of the loader in fully extended position for loading and unloading half height (stacked) cargo containers.

A cargo-handling system 10 is shown, in FIG. 1, to include a truck 12 including a cab 14 and a van 16 enclosing a bed 18 which is provided for support of a plurality of cargo containers 20 thereon. FIG. 1 illustrates a combination of a plurality of full height containers 22 and half height containers 24 carried on bed 18. A container loader apparatus 26 is shown pivotally attached to the rear 28 of van 16. FIG. 2 illustrates truck 12 as having an unenclosed bed 30, and container loader apparatus 26 is secured to the rear of bed 30. A container transfer cart 32 is shown adjacent to the end 34 of loader apparatus 26.

As seen in FIG. 4, transfer cart 32 is shown unloading a container therefrom onto a container lift 35 for storage onto a storage rack 36, the container having been loaded onto the transfer cart from the truck bed via the container loader apparatus 26. The container loader apparatus is shown to be a scissors-type screw jack which is extended and retracted by a rotatable screw 38 (FIG. 6) carried in the base 40 of the frame 42 of the loader apparatus 26. A handle (not shown) is provided for rotation of screw member 38.

Figure 6:
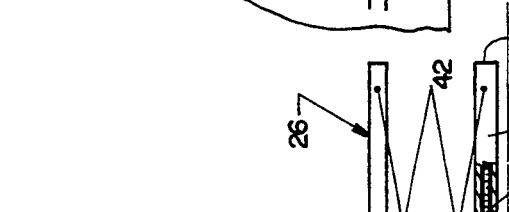
FIG. 6 is a partial elevational view of the loader in partially raised position for loading and unloading full height cargo containers directly from the bed of a truck.
Figure 5:
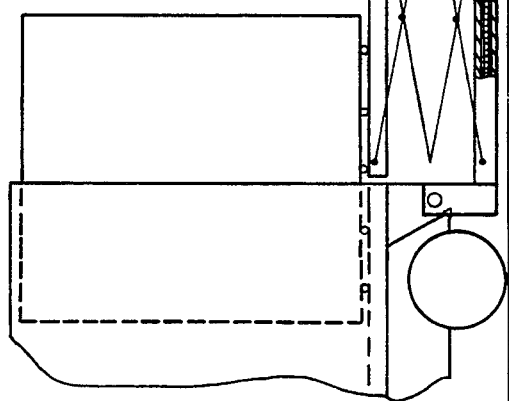
FIG. 5 is a partial elevational view of a truck having a scissors jack loading and unloading device disposed at the rear of the truck. Solid lines illustrate the loader in stored position, and dashed lines illustrate the loader in unstored, retracted operational position.
Figure 9:
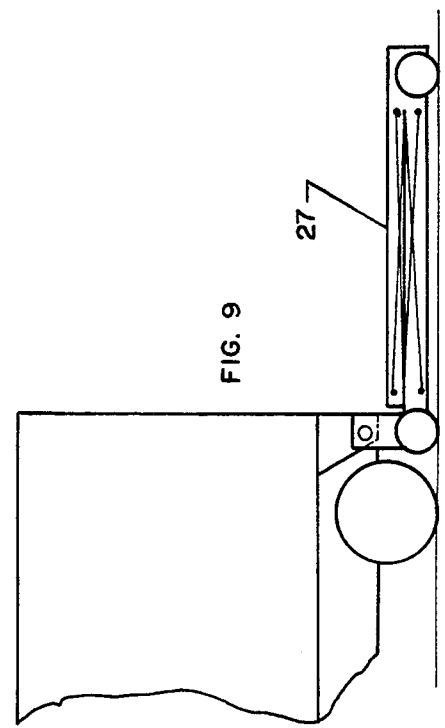
FIG. 9 is a partial side elevational view illustrating the portable loader in the attached and down position.
Figure 8:
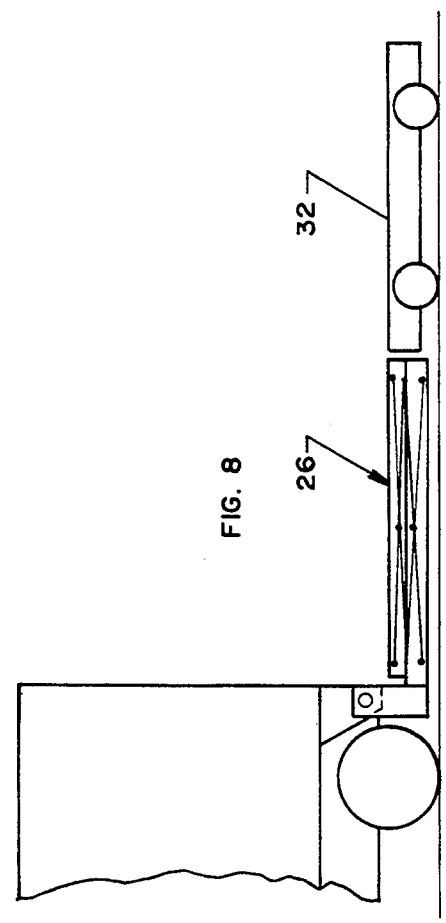
FIG. 8 is a partial elevational view of a truck having the loader and cargo handling transfer cart in transfer position.

FIGS. 5-9 illustrate various operational positions of the container loader apparatus 26. FIG. 5 illustrates the loader 26 in stored (solid lines) and operational, retracted (down) position (dashed lines). FIGS. 6 and 7, respectively, illustrate loader 26 in position to load or unload full and half height containers. FIG. 8 illustrates the loader in adjacent relation with the transfer cart for transferring a container from the transfer cart to the truck bed, the container having been obtained from the warehouse storage rack by the transfer cart. FIG. 9 illustrates a self-portable container loader 27 in its down operational position. The self-portable container loader is to remain at the freight yard or storage area and is to be brought to the trailer for loading or unloading. This type of loader is to be used in situations where the truck does not carry a loader.

FIGS. 10, 11, and 12 illustrate trailer bed tracks 46 on the bed of the trailer and on the top of the half height containers. The bottom of the full height and half height containers is provided with a series of spaced, in-line rollers 62. FIG. 10 illustrates tracks which are secured to existing trailer beds 52 on the top of the trailer bed surface. FIG. 11 illustrates tracks embedded beneath the surface of a trailer bed 56 as could be done during the manufacture of trailer beds.

As shown more clearly in FIG. 20, tracks 46 are inverted "T" tracks and are located on the trailer floor, the loader deck, the transfer cart deck, and the top of the short containers. The inverted "T" tracks secure the containers to the trailer during transport to the trailer, while on the loader, and during travel to the trailer.

The half height containers with the inverted "T" tracks on top permits the containers to be stacked in interlocking relation on the trailer. If necessary, a mix of full height and half height containers may be carried in the same load. It is desirable, however, in this configuration that all half height containers be located in a row at the rear of the trailer to allow for stacking or stacked at the rear of the trailer and rolled forward as a full height unit.

As seen in FIGS. 12 and 13, rollers 62 are mounted to the bottom of the containers for movement along and in a channel 49 (FIG. 20) of the track. The full height containers 22, indicated by the dashed lines, and the half height containers 24 which are disposed for movement in the tracks include container hooks 60 disposed on the bottom and at both ends of the container and in line with the rollers. The container hooks are located on both ends of the two rows of rollers to provide container stability during travel on the transfer cart, during raising and lowering of the loader, and to lock the container securely to the trailer. The roller assemblies include wheels 62 which are adapted for positioning in the tracks for movement therealong. The container clamp assembly 64 (FIGS. 17, 18, and 19) is provided for securing adjacent containers together and to the track, and a container lock assembly 100 (FIGS. 28, 29, and 30) is provided to lock the last container to the track. Lock assembly 100 serves to keep the containers from falling off the transfer cart and may be also used to position containers for load distribution during trailer loading. A detailed description of the container hooks 60, clamp assembly 64, and lock assembly 100 is set forth hereinbelow.

As seen in FIG. 12, the top of the half containers and the trailer bed (FIG. 10) includes a track 46 to receive a track/container clamp assembly 64 slidably therein. The track/container clamp slides onto the track in between containers. The container hooks 60 fit into and are engaged by the track/container clamp for secured relation of the containers during travel of the trailer.

The container hook 60 (FIGS. 14, 15, and 16) is shown to include a hook member 66 having a safety pad 68 secured to the bottom thereof and an attachment bar 70 secured to the top of hook member 66. The track/container clamp assembly 64 (FIGS. 17 and 18) is shown to be an inverted rectangular U-shaped assembly having an upper member 72 and a pair of downwardly extending side members 74 and 76 and a downwardly inverted "V" projecting portion 77 between sides 74 and 76. Sides 74 and 76 mate with base members 79 and 81. FIG. 20 illustrates the track and, track/container clamp 64 in mating relation.

Figure 21:
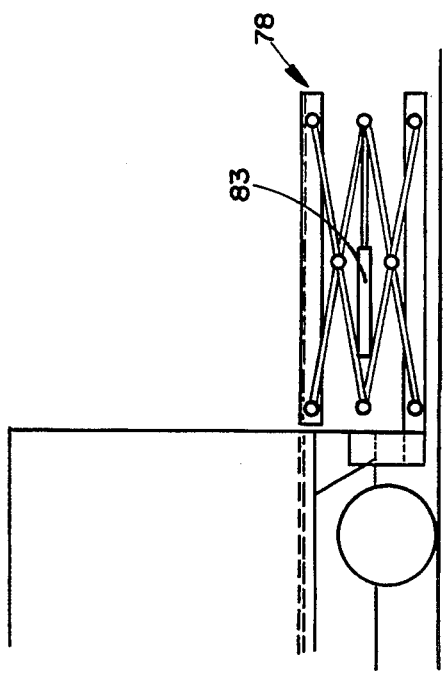
FIG. 21 is a partial elevational view of a truck and hydraulically actuated loader.
Figure 22:
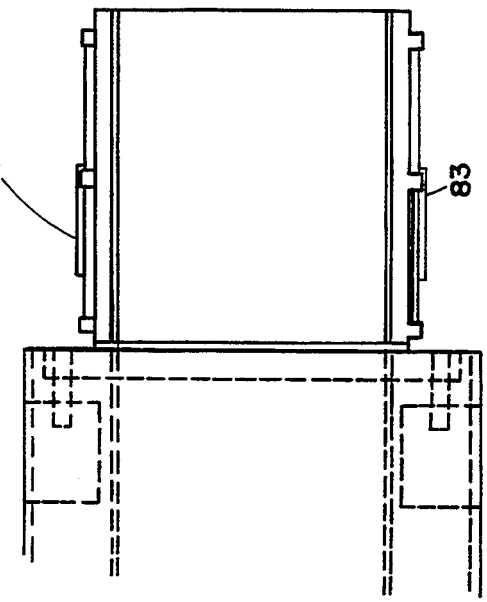
FIG. 22 is a plan view of the apparatus of FIG. 21.

FIGS. 21 and 22 illustrate fluid (hydraulic or pneumatic) actuated scissors jack type of loader apparatus 78. A pair of fluid actuators 83 are disposed on opposite sides of the platform to raise and lower the platform.

Figure 23:
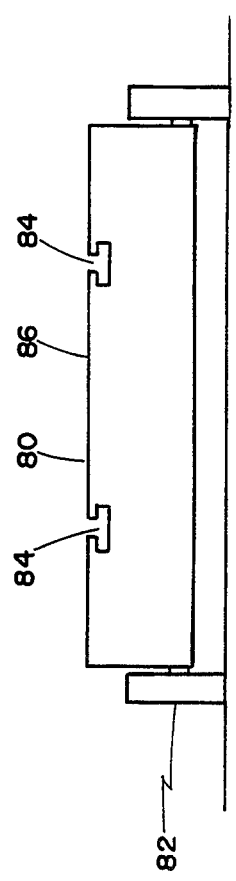
FIG. 23 is an end elevational view of a transfer cart having a track on its upper surface.

FIG. 23 illustrates an end view of a tracked container transfer cart 80. The cart is shown to have wheels 82 on the sides thereof and a pair of tracks 84 in the upper support surface 86 of the cart.

Figure 24:
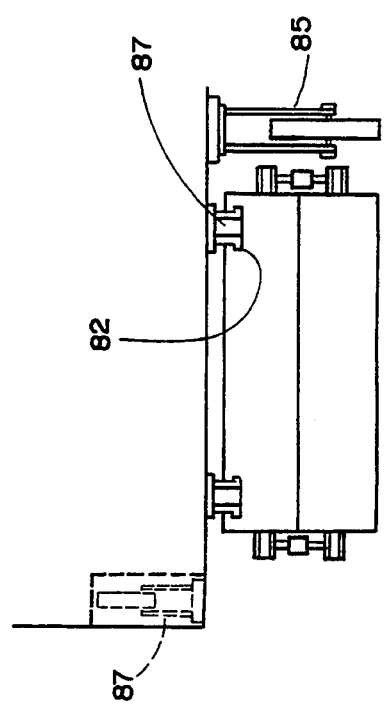
FIG. 24 is an end elevational view of a self-portable container loader system.

FIG. 24 illustrates a self-portable container embodiment of the present invention. The container is shown to have rollers 87 mounted on the bottom thereof which are disposed for positioning in the loader tracks 82. Detachable transfer wheels 85 or optional retractable container wheels 87 are mounted at the sides of the container.

FIGS. 25, 26, and 27 illustrate an open-type container 90 for pallet handling. The containers 90 are provided with tracks 92 at the top 94 thereof and rollers 96 at the bottom 98 thereof. Container hooks 60 are typically provided at both ends of the container. The top 94 and bottom 98 are reinforced with a honeycomb structure or the like.

FIGS. 28, 29, and 30 illustrate side, end, and top views, respectively, of the track lock mechanism 100 for locking the container to the tracks of the trailer and transfer cart. The track lock mechanism includes a locking wheel 102 eccentrically mounted on an off-center shaft 103 which extends between a pair of side members 104 and 106. Each side member 104 and 106 has an extending portion 108 and 110, respectively. A removable clamp assembly 112 includes an upper portion 114 having a pair of inwardly extending portions 116 and 118 depending therefrom, which extend into recesses 120 and 122 of side members 104 and 106. The clamp assembly includes a threaded bolt-like member 124 which engages the wheel. A lever 126 extends from locking wheel 102. The lock mechanism is positioned adjacent to the last container, and the lever is moved downwardly (clockwise relative to shaft 103) to move the wheel surface against the bottom surface in the track recess. Member 124 is rotated downwardly against the upper surface of lever 126 to lock the assembly to the track. The side members 108 and 110 exert an upward force against the lower surfaces of the "T" to retain the clamp in engaged relation with the track.

I claim:

1. A cargo handling and restraining system for use in loading, unloading, and transporting of cargo containers in a carrier having a cargo supporting floor comprising:

a plurality of tracks extending longitudinally along said floor, said tracks having an upper surface provided with a pair of spaced, laterally extending portions and a channel extending between said laterally extending portions;

said container having support members on the bottom thereof, said support members disposed for riding in said channel of said tracks during loading and unloading of said containers and for locked relation with said tracks during transportation of said containers, said containers being permitted to move longitudinally along said track while in said locked relation with said tracks;

first locking means cooperating with said container and said tracks to securely lock said containers to said tracks during the transportation thereof;

said cargo containers being provided with forward, rear, top, and bottom surfaces, and said first locking means being defined as a container/track locking assembly which is positioned in mating adjacent relation with said sear surface adjacent to said bottom surface of the last container placed on said cargo supporting floor, said first locking means having securing means for securing said last container to said tracks;

said first locking means including an upper plate, first and second downwardly extending side portions, and a pair of track engaging portions, each track engaging portion respectively extending in substantially normal relation to said downwardly extending portions; and said securing means is a disc eccentrically, rotatably mounted on a shaft extending between said downwardly extending portions, said disc having a lever arm extending therefrom for movement therewith, and retaining means for engaging said lever arm for retaining said lever arm in a predetermined position responsive to rotational movement thereof, whereby said disc performs a camming action against said track and said upper plate for secured relation of said first locking means to said track.

2. Apparatus as set forth in claim 1 wherein said retaining means is a member threadably mounted in said upper plate and having a lower surface for engaged relation with said lever arm.

3. A cargo handling and restraining system for use in loading, unloading, and transporting of cargo containers in a carrier having a cargo supporting floor comprising:

a plurality of tracks extending longitudinally along said floor, said tracks having an upper surface provided with a pair of spaced, laterally extending portions and a channel extending between said laterally extending portions;

said container having forward, rear, top, and bottom surfaces and support members on the bottom thereof, said support members disposed for riding in said channel of said tracks during loading and unloading of said containers and for locked relation with said tracks during transportation of said containers, said containers being permitted to move longitudinally along said tracks while in said locked relation with said tracks;

first locking means cooperating with said container and said tracks to securely lock said containers to said tracks during the transportation thereof, said first locking means being defined as a container/track locking assembly which is positioned in mating adjacent relation with said rear surface adjacent to said bottom surface of the last container placed on said cargo supporting floor, said first locking means having securing means for securing said last container to said tracks;

container hook means provided on said forward and rear surface, adjacent to said bottom surface, of said cargo containers;

second locking means disposed for positioning between adjacent cargo containers for engaging a first said hook means extending from said forward surface of a first cargo container and for engaging a second said hook means extending from said rearward surface of a second, adjacent cargo container for secured relation of said first and second containers; and said second locking means includes an inverted U-shaped member, the upper portion of said U-shaped member having a downwardly projecting portion, extending between spaced side portions of said U-shaped member, and a pair of track engaging members, each track engaging member extending in substantially normal relation to a said side portion of said U-shaped member.

4. Apparatus as set forth in claim 3 including a loader having an elevatable upper platform for receiving said containers thereon and elevating said containers to a predetermined lever whereby said containers are moved from said platform with said support members adapted for positioning in said channel of said tracks.

5. Apparatus as set forth in claim 4 including a transfer cart having an upper surface, said cart disposed for moving said container to said loader whereby said container is transferred from said upper surface of said transfer cart to said elevatable platform of said loader.

6. Apparatus as set forth in claim 5 wherein said loader and said transfer cart are provided with tracks having an upper surface provided with a pair of spaced, laterally extending portions and a channel extending between said laterally extending portions, said tracks of said cargo supporting floor of said carrier, said loader and said transfer cart disposed for aligned relation during the loading and unloading of said container.

* * * * *